Figure 1:
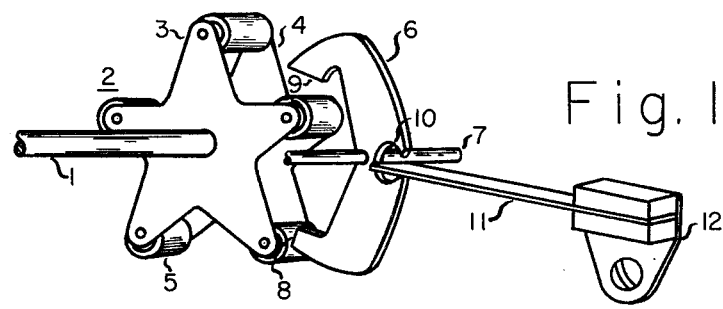

Sept. 11, 1962   G. M. DE GRYSE ETAL   3,053,041
VIBRATION-RESISTANT ESCAPEMENTS Filed Aug. 14, 1958   2 Sheets-Sheet 1

INVENTORS
GENTIEL M. DE GRYSE
JAMES W. OTIS
JOHN A. WEBER

Bruno C. Lechler
Attorney

United States Patent Office 3,053,041
Patented Sept. 11, 1962

3,053,041
VIBRATION-RESISTANT ESCAPEMENTS
Gentiel M. De Gryse, East Moline, and James W. Otis and John A. Weber, Moline, Ill., assignors, by mesne assignments, to The Gamewell Company, Newton, Mass., a corporation of Delaware
Filed Aug. 14, 1958, Ser. No. 755,069
3 Claims. (Cl. 58—116)

This invention relates to timing escapements and in particular to self-starting vibration-resistant escapements capable of accurate, reliable operation even when exposed to severe vibration and shock conditions.

Escapements generally are designed to time at a constant rate under normal environmental conditions. Their timing is accurate under these conditions. However, when subjected to rapid acceleration and deceleration and to shock they malfunction, stop completely, or time erratically. Escapements built in accordance with the invention are able to time accurately even though subject to very high vibration.

The advent of missiles and high-speed aircraft with their incumbent shock and vibration problems has caused reappraisal and redesign of timing equipment and components going into these vehicles.

Timing devices built in accordance with the invention have been subjected to 60 G acceleration along one axis of the device with no effect on the timing acuracy. The devices have been accelerated to 20 G's in the intersecting planes with little effect on timing accuracy.

The invention lies in the elimination of the balance wheel and torsion spring and the novel use of a spring reed to supply the decelerating and restoring forces to the lever. The lever assumes the form of a C and has machined surfaces which act as pallets and a circular opening on the reverse side to accept the free end of the spring reed. The balance wheel and the hairspring were eliminated because they are the parts most susceptible to vibration.

The escapement has been speeded up so that outside vibration will have less relative effect on timing. The rate of oscillation is 20 times greater than the rate of oscillation of a standard escapement.

The escapement is self-starting because the spring reed maintains the lever in its center position when no driving torque is applied. The lever and pallets are ready to start as soon as driving torque is applied to the escape wheel.

The timing rate of the escapement is readily adjustable by simply changing the effective length of the spring reed by moving its mounting post toward or away from the lever.

The timing rate of the escapement can be readily changed over a wide range by changing the material and/or dimensions of the spring reed.

The escapement is especially suited to timing short intervals. It starts to oscillate as soon as torque is applied to the escape wheel and reaches operating frequency almost immediately because of its low inertia.

To maintain top accuracy the escapement is supplied with a constant torque obtained by using only a small percentage of the mainspring turns. Clock escapements are usually designed to time at a constant rate even though the driving torque supplied by the mainspring may vary over a wide range. The invention relates to escapements designed primarily to time a short interval in the order of one second or less.

Objects

It is the principal object of the invention to provide an escapement which will operate satisfactorily under heavy vibration conditions.

It is another object of the invention to provide an escapement having a lever and spring reed adapted to regulate timing.

It is another object to provide an escapement without a balance wheel or hairspring.

It is another object to provide an escapement operating at a high rate of oscillation.

It is another object to provide an escapement readily adjustable by moving a spring reed toward or away from its cooperating lever.

It is another object to provide an escapement whose timing rate is readily changed by changing the dimensions or material of its spring reed.

Figure 2:
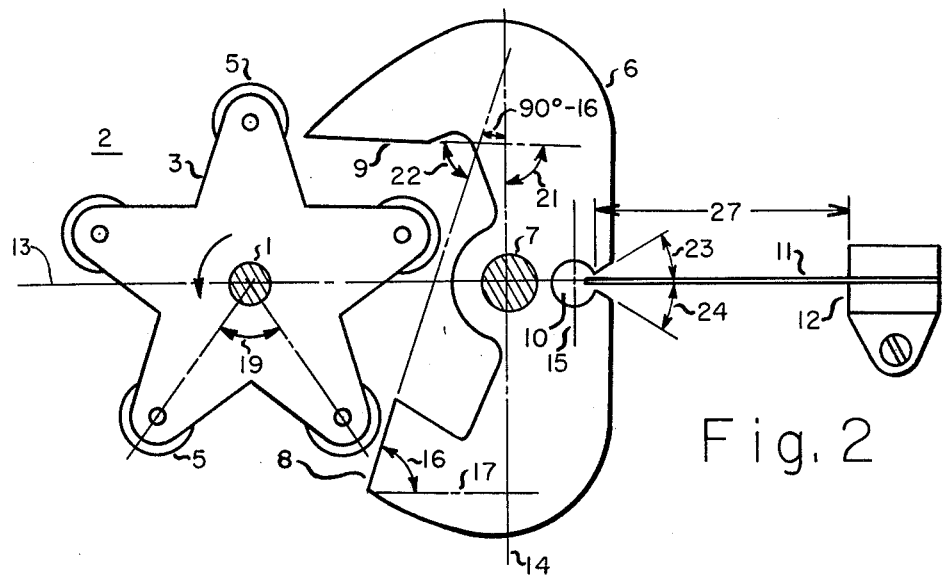
Figure 3:
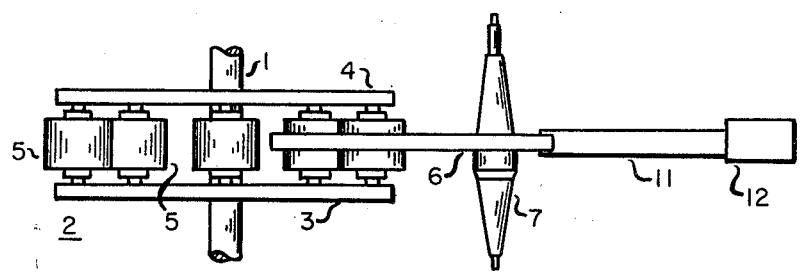
Figure 4:
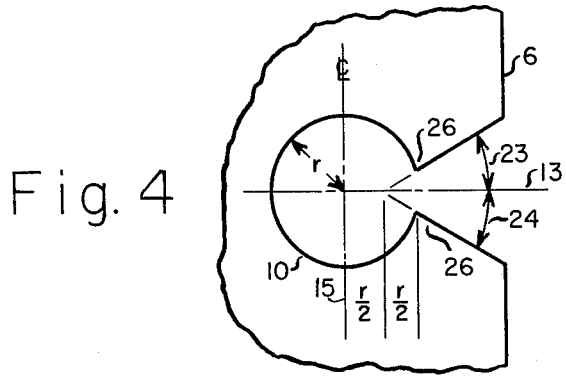
Figure 5:
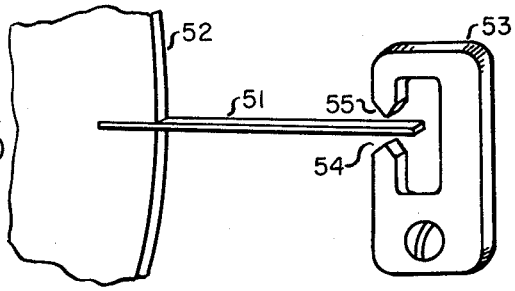
Figure 6:
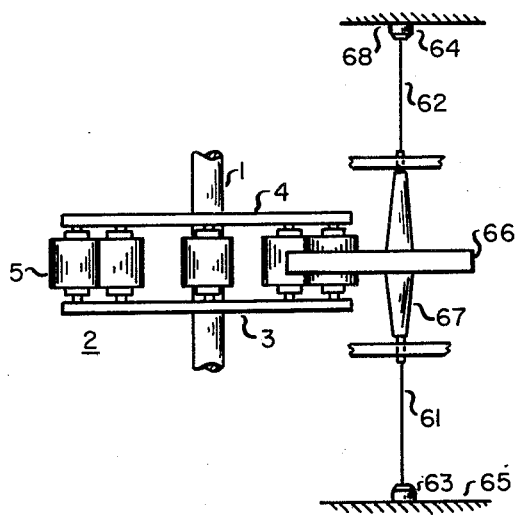

The invention will be described further with reference to the following drawings of which, FIGURE 1 is an isometric view of the escapement.
FIGURE 2 is a plan view of the escapement.
FIGURE 3 is an elevation of the escapement.
FIGURE 4 is an enlarged view of one portion of the lever.
FIGURE 5 is an isometric view of a second form of the device.
FIGURE 6 is a plan view of another form of the invention.

Preferred Embodiment

The preferred embodiment of the invention is shown in isometric view in FIGURE 1, in plan view in FIGURE 2, and in elevation in FIGURE 3. Drive shaft 1 is driven by any suitable torque supplying device, such as a spring, motor, a rotary solenoid or any other prime mover capable of supplying substantially sustained operating torque. The escape wheel 2 consists of top and bottom plates 3, 4, which are fixedly attached to the drive shaft 1 in substantially identical angular relationship. Five hardened steel escape wheel rollers 5 are positioned between top and bottom plates 3, 4, and are suitably journaled therein. Five holes in each top and bottom plate 3, 4, form bearings for the five rollers 5, the holes being angularly displaced 72° as at the points of a five pointed star. The invention is not dependent on the particular configuration of the escape wheel, consequently any suitable escape wheel may be employed without departing from the spirit of the invention.

Lever 6 is fixedly attached to lever staff 7 which is free to oscillate in suitable bearings (not shown) and is displaced a proper distance from drive shaft 1 and is parallel thereto and in the same plane. The distance between lever staff 7 and drive shaft 1 is determined by the working relationship between the rollers 5 and the pallet surfaces 8, 9 of lever 6. The receiving pallet 8 and the let-off pallet 9 constitute machined surfaces on the ends of C-shaped lever 6. Jeweled pallets may be set in the ends of the lever or pallet pins may be used with an escape wheel having radial, peripheral teeth. Since the novel feature of the invention does not lie in the design or layout of pallets and/or escape wheels any of these may be properly varied without altering the invention.

Lever 6 has slot 10 in the side opposite the pallets in which the free end of spring reed 11 operates. The size, shape, and location of slot 10 is important to the invention and is shown more clearly in FIGURES 2 and 4. The center of slot 10 is in line with the center of lever staff 7 and drive shaft 1 and the mass on both sides of this center line is approximately equal.

The shape of slot 10 is circular with a V-shaped notch between the hole and the edge of the material. The center of the circular portion of the slot lies at least one radius within the material so that the V-shaped opening may accomodate the free end of spring reed.

The other end of the spring reed 11 is firmly clamped to post 12 which in turn is fixed to the mechanism frame (not here shown). The plane of the spring at rest is identical with the plane through drive shaft 1 and lever staff 7 so that substantially equal amounts of energy are absorbed and imparted during each half cycle of oscillation of lever 6.

Spring reed 11 is in the preferred embodiment flat but may be of different cross section without departing from the spirit of the invention. To make it least susceptible to environmental vibration it is of small mass. For best balance between long life, reliability, and operating stability it is fashioned of spring steel. It could be made of heat treated beryllium copper, phosporous bronze, or any suitably resilient material without departing from the spirit of the invention.

Having thus given a brief description of the preferred embodiment of the invention, an explanation of the geometry of the escapement will now be made.

*Escapement Geometry*

Important geometric relationships between the parts of the escapement are shown in FIGURES 2 and 4. The angular and dimensional proportions are shown for the preferred embodiment. One skilled in the art may make minor changes without departing from the spirit of the invention. For instance, a different number of rollers 5 may be used on the escape wheel 2, thus altering many of the angular relationships shown. A different design of the escape wheel 2 might include peripheral, radial teeth as generally used in horological instruments, rather than the rollers 5 shown. Pallet pins on the lever 6 may be substituted for the machined surfaces 8, 9.

Referring to the details shown in FIGURE 2, the escape wheel consists of top plate 3, and bottom plate 4 immediately behind, carrying a plurality of rollers 5 suitably journaled therein. The assembly is fixedly attached to drive shaft 1 to which the driving torque is applied. The driving torque tends to rotate escape wheel 2 in a counterclockwise direction. Levers 6 and spring reed 11 serve to retard and to time the rotation of escape wheel 2.

Lever 6 is fixedly attached to lever staff 7 which is suitably journaled in side members of a frame (not here shown). Drive shaft 1 and lever staff 7 are parallel and in the plane indicated by line 13. Lever 6 has three important surfaces, receiving pallet 8, let-off pallet 9, and a keyhole shaped slot 10. Centerline 14 runs through the center of lever staff 7 and is normal to plane 13. Centerline 15 runs through the center of the circular portion of slot 10 and is also normal to plane 13, and thus parallel to centerline 14.

Angle 16, the angle that the receiving pallet 8 makes with line 17 (parallel to plane 13) is slightly greater than angle 19. Angle 19 is the angle between adjacent rollers 5 and is found by dividing 360° by the number of rollers 5. In this embodiment angle 19 is 72° and angle 16 is 72°7'.

Angle 21, the acute angle that the let-off pallet 9 makes with centerline 14, should be less than 90° and in this embodiment is 89°42'.

Angle 22, the angle included by the surfaces of the two pallets 8 and 9, should be somewhat greater than the angle 19 between any two rollers 5, and in this embodiment is 72°25'. Angle 22 equals $$180° - (90° - \angle 16) - \angle 21$$

or 180° − (17°53') − (89°42'), or 72°25'.

The design of the circular slot 10 in the lever 6 is important to the proper functioning of the invention. Angles 23 and 24 are defined as the angles the V-shaped cut away portion of the slot make with the plane line 13. Their apex is located approximately r/2 from the centerline 15 of circular opening 10. The projections 26 form stops which, together with spring reed 11, limit the rotation of lever 6. Distance r is the radius of circular opening 10.

The distance between projections 26 shown in FIGURE 4 is approximately three times the thickness of the spring reed 11. In the preferred embodiment the distance between projections 26 is 0.008 inch and the thickness of spring reed 11 is 0.003 inch. This allows a clearance of 0.002 inch on each side of the spring to accommodate the spring when lever 6 is turned through a 25 degree arc.

Spring reed 11 is constructed of a material and has a cross sectional area and length to function properly in each form of the invention. In the preferred embodiment it is a seven power spring steel reed of effective length 27. Post 12 may be designed to be adjustable toward or away from the lever 6, to the left or to the right as in FIGURE 2, so as to provide some adjustment in the effective length 27 of spring reed 11 and consequently in its rate of oscillation.

The mass-inertia of lever 6 and spring reed 11 is necessarily small in the preferred embodiment to permit rapid oscillation. It has been found that an escapement oscillating at a high frequency is less susceptible to malfunction due to externally applied vibration than a slow oscillating escapement. In a fine watch the balance wheel makes one complete oscillation in two-fifths of a second. In the preferred embodiment of the present invention the lever 6 makes one complete oscillation in two-hundreths of a second, or 50 oscillations per second.

In order to permit a better understanding of the invention a short description follows illustrating one timing device controlled by the present invention.

In the timer used as an illustration a rotary solenoid winds a prewound, multi-turn coil spring one-eighth additional turn or 45 additional degrees. The output torque of the coil spring is substantially constant through its one-eighth (45°) turn. It has been found that the torque may vary as much as plus or minus 15 percent without altering the timing of the device more than plus or minus 1 percent. The torque is transmitted through a suitable gear train to drive shaft 1 and thus to the escape wheel 2.

In one short range timer the escape wheel 2 makes ten revolutions per second. There are five rollers 5 on escape wheel 2; each roller strikes first the receiving pallet 8 and then the let-off pallet 9, driving the lever at the rate of 100 beats (or Hertz) per second. Two beats are required for each complete oscillation; lever 6 thus makes 50 oscillations per second. Spring reed 11 also makes 50 complete oscillations per second. To illustrate one major difference between this embodiment of the invention and the normal oscillating escapement, the balance wheel in a fine watch makes 18,000 beats (Hertz) per hour, or 5 beats per second, or 2½ oscillations per second. Thus, the present invention oscillates 20 times faster than the average escapement.

The novelty of the invention resides in a completely new, low mass, oscillating mass-inertia device operating at unusually high oscillation frequencies to overcome the effect of externally applied force and acceleration.

The escapement is intended to be used with timing devices designed to time intervals in the order of one second or less. Timing devices built in accordance with the invention have been designed to time ten seconds, however. The invention gives greater accuracy in the short timing ranges because it utilizes a mainspring supplying substantially constant torque. Presently known mainsprings are not able to supply a substantially constant torque over their full operating range. Therefore, an intermittently energized winding device is applied to the mainspring whenever the invention is used in an extended range time. Timing devices employing the subject invention as a regulating means satisfy all of the requirements imposed on them, including timing accuracy. Prior art escapements malfunction under the environmental conditions imposed.

The accuracy of a timing device incorporating the invention may be somewhat dependent upon its position in relation to the direction of externally applied forces. External forces are least effective when applied in a direction along the axis of the lever staff, as when the force is vertical and the escapement is oscillated in the horizontal plane. Timing devices incorporating the invention have been designed to employ the escapement in the horizontal plane. Obviously, the escapement will function in any plane but obtains its highest accuracy in the plane noted.

Timing regulation is readily accomplished by changing the effective length of spring reed 11 by moving post 12 toward or away from lever 6. Post 12 and enclamped spring reed 11 may be moved closer to lever 6 to increase the timing rate. The circular portion of slot 10 in lever 6 is sufficiently large to permit the end of spring reed 11 to be moved further into the slot without reclamping the spring. This shortens the effective length 27 of spring reed 11, shortens the time required for an oscillation of lever 6 and increases the timing rate. Increasing the effective length 27 of spring reed 11 by moving post 12 away from lever 6, and reclamping spring 11 if necessary, increases the time required for an oscillation of lever 6 and decreases the timing rate.

Larger changes in timing are usually effected by changing the dimensions or the material of the spring reed 11. Materials having a greater modulus of elasticity or being wider or thicker have a shorter moment which results in a more rapid timing rate. Materials having a lesser modulus of elasticity or being narrower or thinner have a longer moment which results in a less rapid timing rate.

The relationships enumerated above are evident from an examination of the formula for deflection of a cantilever leaf spring:

$$d = \frac{FL^3}{3EI}$$

where $d$ = deflection
$F$ = force applied at effective length
$L$ = effective length of cantilever leaf spring
$E$ = modulus of elasticity of spring material
$I$ = moment of inertia of cantilever leaf spring For any given spring reed all of the factors above are constant except force $F$. The constant factors may be grouped into a spring constant $K$ and the formula simplified to:

$$d = KF$$

The force applied to the spring reed 11 is substantially constant because the torque applied to the escape wheel 2 is substantialy constant. The main spring is tightly wound and unwinds only one-eighth turn during timing. A fifteen percent decrease in main spring torque has been found to increase timing only one percent. As applied, the torque supplied by the main spring decreases much less than fifteen percent during timing. Thus, the deflection is substantially constant resulting in a substantially constant timing rate.

Another form of the invention is shown in FIGURE 5. Spring reed 51 is rigidly attached to lever 52 and is free to flex because it is not rigidly attached to post 53. The opening in post 53 may have approximately the same configuration as the opening 10 in lever 6 as shown in the other figures. The oscillation of spring reed 51 is not as rigidly controlled as in the preferred embodiment. For this reason the arrangement shown in FIGURE 5 times less accurately and is not used in the preferred embodiment. Further, wear on projections 54, 55 is greater.

Spring reed 11 is shown throughout the specification as a cantilever leaf spring but may be made up of a plurality of leaves to increase its force and thus the timing rate. Or, it may be made with any cross sectional design such as rectangular, square, oval, or round. The major axis of a spring having an oval or rectangular cross section should be located so that the spring oscillates satisfactorily in the plane desired, and is least susceptible to externally applied vibration. Spring reed 11 may also be replaced with a pair of torsion bar springs applied directly to the ends of lever staff 67 as shown in FIGURE 6.

*Torsion Springs*

Another form of the invention is shown in FIGURE 6. The device is similar to that shown in FIGURE 3 except the spring reed has been eliminated and replaced with torsion spring 61, 62 attached to the lever staff 67 and to spring mounts 63, 64 fixed in frame members 65, 68. Torsion springs 61, 62 are under tension and at the point of zero torsion maintain lever 66 in its center position. Application of force by rollers 5 to the receiving pallet 8 (shown in FIGURE 2) causes lever 66 to rotate on its axis 67. Torsion springs 61, 62 resist the rotation of lever 66 and restore it to its center position when a roller 5 passes the receiving pallet 8. Likewise, application of force by the same roller 5 to the let-off pallet 9 (shown in FIGURE 2) causes lever 66 to rotate in the opposite direction on its axis 67. Torsion springs 61, 62 resist the rotation of lever 66 and restore it to its center position when the roller passes the let-off pallet 9.

Lever 66, in combination with staff 67 and torsion springs 61, 62, has an oscillation period determined by the moment of inertia of its combined mass. When a greater force is applied by rollers 5 of escape wheel 2, its velocity increases and its arc lengthens but its timing rate remains constant. The escapement may be utilized in a timing device similar to that described above.

Having described one or more forms of the invention it is understood that one skilled in the art may vary its form without departing from the spirit of the invention as set forth in the following claims.

We claim:

1. In a vibration resistant escapement, an escape wheel, a balance lever arranged in cooperative relationship with said escape wheel, said balance lever having a notch formed in the side away from said escape wheel, said notch comprising a circular opening of radius $r$ and having a center located in from the edge of said balance lever a distance greater than $r$, a V-shaped notch opening between said circular opening and said edge, the imaginary apex of said V located at a distance approximately $r/2$ from said center toward said edge, a flat leaf spring having one end mounted away from said notch and the other end spaced within said notch, said leaf spring adapted to alternately retard and restore said balance lever as it is oscillated by said escape wheel, said leaf spring designed to be effective under conditions of externally applied vibration up to twenty gravities.

2. An improved escapement designed to substantially eliminate the effect of externally applied vibratory forces up to 20 times gravity in at least one plane, comprising a C-shaped balance lever mounted on a staff, an escape wheel mounted on a shaft and located in operative relationship with said balance lever, said balance staff and said wheel shaft journaled in a common plane, a leaf spring having means mounting said spring in said common plane, a slot in said balance lever adapted to receive the free end of said leaf spring, said slot located in said common plane when said lever is at rest, said slot comprising a circular opening having one side flared toward the edge of said lever, the flare providing a longitudinal opening approximately three times the thickness of said flat spring.

3. In a vibration-resistant escapement, a balance arranged in cooperative relationship with an escape wheel, said balance having a notch in its side away from said escape wheel, said notch comprising a circular opening having its center located in from the edge of said balance a distance greater than the radius of said circular opening, a V-shaped opening between said circular opening and said edge, the apex of said V located away from said center and toward said edge, a leaf spring having one end mounted away from said notch and the other end spaced within said notch, said leaf spring designed to effectively retard and restore said balance lever as it is oscillated by said escape wheel under conditions of externally applied vibration.

References Cited in the file of this patent

UNITED STATES PATENTS

| 991,048 | Crank | May 2, 1911 |
| 2,362,836 | McCullough | Nov. 14, 1944 |
| 2,385,011 | Lurtz | Sept. 18, 1945 |

FOREIGN PATENTS

| 16,698 | Switzerland | May 19, 1900 |
| 10,935 | Great Britain | May 8, 1909 |
| 1,141,090 | France | Mar. 11, 1957 |
| 327,019 | Switzerland | Feb. 28, 1958 |